(12) United States Patent
Krishnan

(10) Patent No.: US 7,506,500 B1
(45) Date of Patent: *Mar. 24, 2009

(54) PROPULSION FROM COMBUSTION OF SOLID PROPELLANT PELLET-PROJECTILES

(76) Inventor: Vinu B. Krishnan, 3533 Khayyam Ave., Orlando, FL (US) 32826

( * ) Notice: Subject to any disclaimer, the term of this patent is extended or adjusted under 35 U.S.C. 154(b) by 92 days.

This patent is subject to a terminal disclaimer.

(21) Appl. No.: 11/595,251

(22) Filed: Nov. 10, 2006

(51) Int. Cl.
*F02K 9/28* (2006.01)
*F02C 3/26* (2006.01)

(52) U.S. Cl. .................. 60/250; 60/251; 60/39.464

(58) Field of Classification Search .................. 60/250, 60/251, 253, 254, 256, 259, 172, 39.464, 60/39.821

See application file for complete search history.

(56) References Cited

U.S. PATENT DOCUMENTS

| | | | | | |
|---|---|---|---|---|---|
| 1,103,503 | A | * | 7/1914 | Goddard | 60/250 |
| 1,191,299 | A | * | 7/1916 | Goddard | 60/250 |
| 1,194,496 | A | * | 8/1916 | Goddard | 60/250 |
| 1,206,837 | A | * | 12/1916 | Goddard | 60/250 |
| 2,676,456 | A | * | 4/1954 | Holzwarth | 60/259 |
| 3,043,105 | A | * | 7/1962 | Hagerty | 60/250 |
| 3,302,568 | A | * | 2/1967 | Biehl | 60/250 |
| 3,328,963 | A | * | 7/1967 | Kraus | 60/250 |
| 5,063,735 | A | | 11/1991 | Colgren et al. | 60/246 |
| 6,152,039 | A | * | 11/2000 | Lee et al. | 102/200 |
| 6,367,244 | B1 | * | 4/2002 | Smith et al. | 60/251 |
| 6,705,075 | B1 | * | 3/2004 | Highsmith et al. | 60/253 |

FOREIGN PATENT DOCUMENTS

DE             4014687       *    1/1991    .................. 244/172

* cited by examiner

*Primary Examiner*—Michael Cuff
*Assistant Examiner*—Gerald L Sung
(74) *Attorney, Agent, or Firm*—Brian S. Steinberger; Law Offices of Brian S. Steinberger, P.A.

(57) ABSTRACT

Propulsion from combustion of solid propellant pellet-projectiles for providing a useful propulsion that has the advantages of both solid and liquid propulsion engines, and also can make use of either solid chemical propellants or fissionable nuclear material as the fuel. Preferred methods and systems can include a storage chamber for storing solid propellant pellets, a feeding system having a pellet feeding channel and a pellet feeding mechanism connected to the storage chamber and to a gun assembly, which is positioned along a longitudinal axis to eject the pellets at a certain velocity. A triggering system positioned between gun assembly and thrust chamber can initiate the propellant pellet-projectile, and a thrust chamber having a combustion chamber for combustion of propellant pellet-projectile with an exhaust nozzle. Additionally, an auxiliary power system can be used to power the components and various electrical and electronic systems that may be present in the invention for controlling the engine components. The gun assembly may include an ejector mechanism for ejecting the propellant pellets through at least one barrel. The triggering system can produce a medium creating an ambience for the initiation of propellant pellet-projectiles. Methods and systems can be used for space and rocket crafts, turbojets and ramjets.

10 Claims, 13 Drawing Sheets

US 7,506,500 B1

PROPULSION FROM COMBUSTION OF SOLID PROPELLANT PELLET-PROJECTILES

This invention claims the benefit of priority of U.S. Provisional Patent Application 60/347,451 filed Nov. 1, 2001, and U.S. Provisional Patent Application 60/333,300 filed Nov. 14, 2001, and this invention relates generally to propulsion systems and more specifically it relates to methods and systems for the propulsion from combustion of solid propellant pellet-projectiles for providing a useful propulsion method that would have the advantages of both solid and liquid propulsion engines, and also can make use of either solid chemical propellants or fissionable nuclear material as the fuel.

BACKGROUND AND PRIOR ART

Propulsion systems have been in use for years. See U.S. Pat. No. 5,063,735 to Colgren. The typical propulsion system can include solid propellant motors, liquid propulsion engines, jet engines, and a combination of jet engine and solid motor such as solid propellant gas generator to start a jet engine and Rocket-powered ducted fan engine.

A main problem with conventional solid propulsion systems are the difficulties in thrust control. Another problem with conventional solid propulsion systems are complications involved in the reuse of solid motor case and other parts. Another problem with conventional solid propulsion systems is that the chamber enclosing the solid charge must be strong enough to withstand the heat and high pressures of combustion.

A problem with liquid propulsion rocket engines is that they contain volatile, toxic, corrosive and/or cryogenic propellants. Hence the engine is usually filled a short time before firing, thus requiring complicated and lengthy pre-fitting preparations.

A problem with Rocket-powered ducted fan engine is that it can work only as a toy vehicle power plant. Also, only about fifty percent of exhaust gases are available for useful propulsion.

The prior art devices described above would not as suitable for providing a useful solid propulsion method that would have the advantages of both solid and liquid propulsion engines. Additionally, these prior art devices cannot make use of either solid chemical propellants or fissionable nuclear material as the fuel.

SUMMARY OF THE INVENTION

The first objective of the present invention is to provide a method and system for providing propulsion from the combustion of solid propellant pellet-projectiles having the advantages of both solid and liquid propulsion engines.

The second objective of the present invention is to provide a method and system for providing propulsion from combustion of solid propellant pellet-projectiles that can make use of either solid chemical propellants or fissionable nuclear material as the fuel.

The third objective of the present invention is to provide a method and system for providing propulsion from combustion of solid propellant pellet-projectiles that can be incorporated into jet engines and be used for jet aircraft.

The fourth objective of this invention is to provides a method and system for providing propulsion from combustion of solid propellant pellet-projectiles that can be used as propulsion for rockets and space flights.

The fifth objective of the present invention is to provide a method and system for providing propulsion from combustion of solid propellant pellet-projectiles that can be used for thrust control and reusability of the engine.

The sixth objective of the present invention is to provide a method and system for providing propulsion from combustion of solid propellant pellet-projectiles having advantages over liquid propellant engines such as but not limited to higher volumetric loading of propellants and ability to throttle.

The seventh objective of the present invention is to provide a method and system for providing propulsion from combustion of solid propellant pellet-projectiles that can have the advantages of using solid propellants such as but not limited to storability and low cost of maintenance.

The eight objective of the present invention is to provides a method and system for providing propulsion from combustion of solid propellant pellet-projectiles that can make use of the reliability of solid propellants.

A preferred embodiment of the invention includes a storage chamber where solid propellant pellets are stored, a feeding system having a pellet feeding channel and a pellet feeding mechanism with one end of the said channel connected to the storage chamber and other end to a gun assembly. The gun assembly can be positioned along a longitudinal axis to eject the pellets in the direction of said longitudinal axis at a certain velocity, a triggering system positioned between gun assembly and thrust chamber along said longitudinal axis for initiating the propellant pellet-projectile, and a thrust chamber having a combustion chamber where combustion of propellant pellet-projectile takes place and an exhaust nozzle with said combustion chamber positioned between the triggering system and exhaust nozzle along said longitudinal axis. Moreover there is an auxiliary power system that can be used to power the pellet feeding mechanism, gun assembly, triggering system and various electrical and electronic systems that may be present in the invention for controlling the engine components.

The invention can additionally include a housing whose axis is the said longitudinal axis, covering mainly the gun assembly, triggering system, and thrust chamber. The storage chamber is an enclosed space for storing the propellant pellets of specific shape profile. The storage chamber may include an outlet and a lid for allowing storage of propellant pellets. The feeding system consists of a feeding channel having an inlet and an outlet, and a feeding mechanism. The feeding mechanism drives the pellets from the storage chamber through the feeding channel into the gun assembly. The gun assembly can include an ejector mechanism and barrel. The ejector mechanism ejects the propellant pellets through the barrel.

The gun assembly can have more than one barrel for ejecting the propellant pellets. The barrel gives direction to the propellant pellets ejected. The triggering system can produce a medium that could create an ambience for the initiation of propellant pellet-projectiles. The thrust chamber generally consists of a combustion chamber and an exhaust nozzle. The thrust chamber is shielded on the inside with material that could withstand the heat and high pressures of combustion of propellant pellets. Also the said shielded chamber would withstand the shocks of detonation. Moreover for the turbojet mode of the invention, a turbine mounted on a hollow shaft in between combustion chamber and exhaust nozzle along the said longitudinal axis may be present. The auxiliary power system can be used for powering various systems within the invention. These above mentioned systems might include pellet feeding mechanism, gun assembly, triggering system, and the various electrical and electronic systems that may be present in the invention for controlling the various engine components. Also, the auxiliary system in the case of turbojet mode of the invention can be used to power the fan and a compressor.

Further objects and advantages of this invention will be apparent from the following detailed description of a presently preferred embodiment which is illustrated schematically in the accompanying drawings.

DESCRIPTION OF THE PREFERRED EMBODIMENTS

Figure 1:
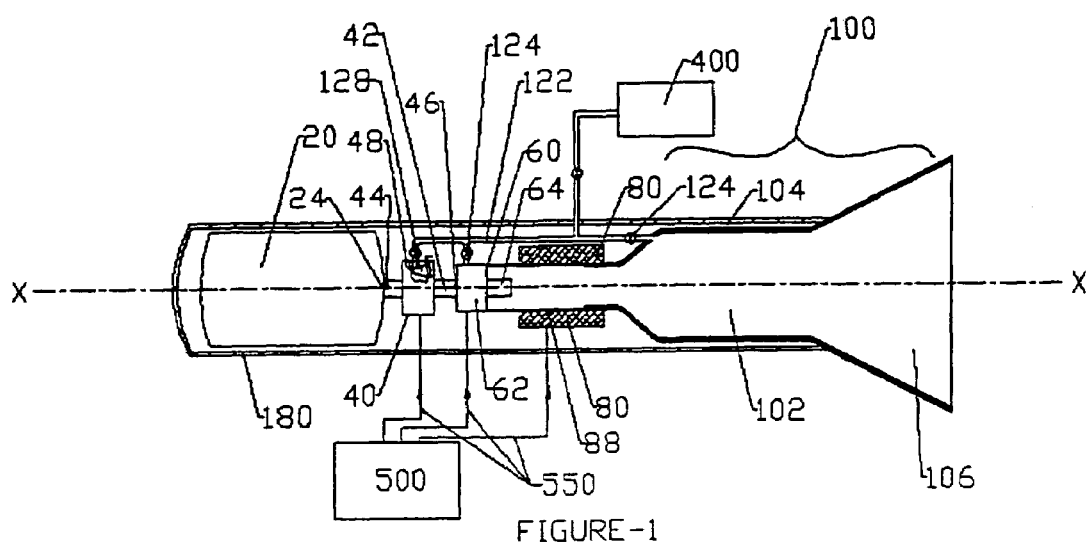
FIG. 1 is a schematic sectional elevation view of a preferred embodiment of he present invention in rocket or space mode using only solid propellants.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

Turning now descriptively to the drawings, in which similar reference characters denote similar elements throughout the several views, the attached figures illustrate a propulsion from combustion of solid propellant pellet-projectiles, which can include a storage chamber where solid propellant pellets are stored, a feeding systems having a pellet feeding channel and a pellet feeding mechanism with one end of the said channel connected to the storage chamber and other end to a gun assembly, a gun assembly positioned along a longitudinal axis to eject the pellets in the direction of said longitudinal axis at a certain velocity, a triggering system positioned between gun assembly and thrust chamber along said longitudinal axis for initiating the propellant pellet-projectile, and a thrust chamber having a combustion chamber where combustion of propellant pellet-projectile takes place and an exhaust nozzle with said combustion chamber positioned between the triggering system and exhaust nozzle along said longitudinal axis.

The invention can use an auxiliary power system that can be used to power the pellet feeding mechanism, gun assembly, triggering system and various electrical and electronic systems that can be present in the invention for controlling the engine components.

Furthermore the invention can include a housing whose axis is the said longitudinal axis, covering mainly the gun assembly, triggering system, and thrust chamber. The storage chamber is an enclosed space for storing the propellant pellets of specific shape profile. The storage chamber may include an outlet and a lid for allowing storage of propellant pellets. The feeding system can consists of a feeding channel having an inlet and an outlet, and a feeding mechanism. The feeding mechanism drives the pellets from the storage chamber through the feeding channel into the gun assembly. The gun assembly can also include an ejector mechanism and barrel. The ejector mechanism ejects the propellant pellets through the barrel. The gun assembly can have more than one barrel for ejecting the propellant pellets. The barrel gives direction to the propellant pellets ejected. The triggering system can be equipment, which produces a medium that would create an ambience for the initiation of propellant pellet-projectiles. The thrust chamber generally consists of a combustion chamber and an exhaust nozzle. The thrust chamber is shielded on the inside with material that could withstand the heat and high pressures of combustion of propellant pellets. Also the said shielded chamber would withstand the shocks of detonation. Moreover for the turbojet mode of the invention, a turbine mounted on a hollow shaft in between combustion chamber and exhaust nozzle along the said longitudinal axis can be present. The auxiliary power system can be used for powering various systems within the invention.

These above mentioned systems can further include pellet feeding mechanism, gun assembly, triggering system, and the various electrical and electronic systems that can be present in the invention. Also, the auxiliary system in the case of turbojet mode of the invention can additionally power other equipment such as but not limited to the fan and a compressor.

The main components of the preferred embodiments will now be described.

Solid Propellant Pellets

The invention can use solid propellant pellets that are either solid chemical propellants or fissionable nuclear material. However the size, shape, mass or type of the solid propellant pellets would not limit the scope of the invention. The solid chemical propellants can be either homogeneous or heterogeneous.

The dimensions and shape of the pellet depends on how fast the complete combustion or detonation of the pellet takes place in flight, after passing through the medium produced by triggering system.

For example a pellet of average outer dimension of 0.25 inch, the initiation time will range from a few nanoseconds to a few milliseconds and the total combustion time will range from a few microseconds to a few hundredth of a millisecond. For a specific size of a pellet both initiation time and total combustion time mainly depend on initiation medium, material, composition, density and shape of the propellant pellet.

A solid chemical propellant pellet can be either a regular chemical propellant or chemical explosive. The solid chemical explosive propellant can be such as but not limited to TNT, RDX, lead azide, a mixture of different explosives and the like. A homogeneous solid chemical propellant can be such as but not limited to nitrocellulose (mono-base propellant) or combination of nitrocellulose and nitroglycerine, to which a plasticizer is added (double-base propellant). A composite or heterogeneous propellant can be such as but not limited to a mixture of Aluminum Powder as fuel, Ammonium Perchlorate as oxidizer, Iron Oxidizer Powder as catalyst, Polybutadiene Acrylic Acid Acrylonitrile as rubber-based binder and Epoxy Curing Agent.

A fissionable nuclear material solid propellant pellet can be such as but not limited to highly enriched plutonium-239 and uranium-235.

Additionally, the slid chemical propellant pellet used can be a fuel without oxidizer, in that case there should be an availability of some form of oxidizer in the combustion chamber 102 which will be described later in more detail. The selection of nuclear propellant as a fuel for the invention is mostly limited to space flights, due to the risk of radiation and hazardous nuclear residue emission from the engine.

Fuel without oxidizer pellets can be such as but not limited to powdered aluminum, beryllium, lithium, sodium or magnesium along with additives such as but not limited to Iron Oxidizer Powder as catalyst, Polybutadiene Acrylic Acid Acrylonitrile as rubber-based binder and Epoxy Curing Agent. Again for combustion there should be an availability of some form of oxidizer in the combustion chamber preferably in the gaseous form such as but not limited to Oxygen, Ozone or Nitrous Oxide.

Storage Chamber 20

Referring to FIGS. 1-6, the storage chamber 20 is preferably an enclosed space for storing the propellant pellets of a selected shape profile to be described in greater detail later. The storage chamber can include an outlet and a lid for allowing storage of propellant pellets. As shown in FIGS. 1 through 6, the storage chamber 20 is preferably an enclosed space having an outlet 24 and can include a lid 22 (FIGS. 3-6). The storage chamber 20 can be constructed of various materials such as but not limited to metal, fiberglass, composites, and the like. Depending on the solid propellant material stored, the storage chamber 20 can include additional protections or equipments for ensuring the safe storage of propellant pellets. For example, for nuclear propellants, the storage chamber can be equipped with materials that can shield of radiation. The shield can be such as but not limited to lead or tungsten shielding.

Feeding System 40

Referring to FIGS. 1-6, the feeding system can include a feeding channel having an inlet and an outlet, and a feeding mechanism. The feeding mechanism drives the pellets from the storage chamber through the feeding channel into the gun assembly. As shown in FIGS. 1 through 6, the feeding system 40 preferably includes a feeding channel 42 and a feeding mechanism 48. The feeding channel 42 is preferably a hollow passage having an inlet 44 and an outlet 46, however various other methods of pellet transportation may be utilized as can be appreciated. One skilled in the art of mechanisms can appreciate that the feeding mechanism 48 can be chosen from a variety of mechanisms that assist in the feeding of propellant pellets.

The feeding mechanism 48 can be such as but not limited to conveyer mechanism driven by auxiliary power system or compressed gas (tapped exhaust gases) feeding pellets from the storage chamber 20 to the gun assembly 60. In the case of conveyer mechanism, the conveyer collects the pellets from the storage chamber 20 through the feeding channel 42 and delivers them to the gun assembly 60. The conveyer can be such as but not limited to chain or belt with space for holding pellets along its face. Again the material for conveyer can be such as but not limited to metal, rubber or polymers.

The feeding channel 42 in the case of multi-barreled gun assembly 60 can be either a single channel feeding all the barrels 64 or multiple channels in which each channel feeding each barrel 64 driven by a single or multiple feeding mechanisms 48.

Gun Assembly 60

Referring to FIGS. 1-6, the gun assembly can include an ejector mechanism and barrel. The injector mechanism ejects the propellant pellets through the barrel. The gun assembly can have more than one barrel for ejecting the propellant pellets. The barrel gives direction to the propellant pellets ejected. As shown in FIGS. 1 through 6, gun assembly 60 preferably includes an ejector mechanism 62 and barrel 64. Again, one skilled in the art of mechanisms can appreciate that the ejector mechanism 62 can be chosen from a wide variety of mechanisms that assist in the ejection of propellant pellets at a certain velocity. The ejector mechanism 62 can be such as but not limited to the mechanism of propelling the pellets using pressurized or compressed gases (tapped exhaust gases). Barrel 64 can be a tubular component formed from metal, and the like. The Barrel 64 can be single barreled or multi-barreled. In a multi-barreled gun assembly 60, the propellant pellets can be ejected from all the barrels at one time. Alternatively, the propellant can be ejected in a specific sequence such as but not limited to one after another.

Triggering System 80

The triggering system 80 can be equipment, which produces a medium that creates an ambience for the initiation of propellant pellet-projectiles. As shown in FIGS. 1 through 6, triggering system 80 can produces a medium that creates an ambience for the initiation of propellant pellet-projectile. The said medium can be a generator such as ones that produce anyone of a flame, a laser emission, microwave radiation, a neutron emission in the case of nuclear propellant pellet-projectile, or any other medium that initiate the combustion of propellant pellet-projectile.

The flame generator can be such as but not limited to flame and heat generated by combustible gases or liquid fuels. Here the flame generator produces heat such that the propellant pellet passing through the environment produced by the said flame generator gets initiated. The temperature developed by the flame generator depends on the type of propellant material used. For example depending on the type and speed of propellant pellet projectile, the temperature of the flame ranges from approximately 400 K to approximately 5000 K.

Laser generator produces CW (continuous wave) or pulsed laser. The laser produced can be such as but not limited to Diode Laser or YAG laser. The solid propellant pellets get heated while passing through the laser medium, thus causing the initiation. The required type of laser depends on the propellant used in the pellet. This is because different materials absorb energy from different wave lengths. For example a near infra-red laser diode (approximately 800 to approximately 2000 nm) that emits a short duration pulse (approximately 1 to approximately 50 ms) can initiate a propellant pellet of certain material.

Microwave generator produces microwave radiations, such that the microwave sensitive propellant pellet absorbs microwave energy and gets heated, causing initiation of the propellant pellet. The frequency of the microwaves generated is likely to be in the range of approximately 0.1 GHz to approximately 100 GHz. The required energy density of the microwaves depends on the propellant used in the pellet. The triggering system 80 can be any equipment that produces a medium of initiation mentioned above. The triggering system 80 generally surrounds the path of the propellant pellet-projectiles, such that the medium of initiation interacts with the said projectiles.

The triggering system 80 can include but not be restricted to cylindrical shape depends on how the generator of the medium produces the initiation of propellant pellets is arranged.

Additionally, the triggering system 80 can be shielded 88 on the inside, covering the path of the propellant pellet-projectile, that resists and safeguard the triggering system 80 from the heat and high pressures of premature detonation of propellant pellet.

The above mentioned shield can be such as but not limited to ceramics or heat resisting alloys. Moreover, the shield should allow the medium produced by the triggering system to pass through.

Alternatively, the initiation of propellant pellet-projectiles can occur without the triggering system 80. One can be timed detonation in which a primer 350 attached to solid propellant pellet 300, such that the primer would trigger the combustion of solid propellant pellet. The primer 350 is an explosive charge that triggers the combustion of solid propellant pellet 300. The ignition of said primer can be done while the propellant pellets leave the gun assembly 60. The timing depends on the delay between the combustion of primer 350 and the combustion of solid propellant 300 present in the pellet.

Still alternatively, the invention can use both solid and liquid propellants, where the heat of combustion of liquid propellant would initiate the solid propellant pellet-projectile.

The liquid propellant may be either monopropellants or bipropellants. Liquid monopropellants can be such as but not limited to nitromethane or hydrogen peroxide mixed with ethyl alcohol. In the case of bipropellants, fuel and oxidizer are kept physically separated until they are injected into the combustion chamber 102. The above mentioned liquid fuel can be such as but not limited to Aniline, hydrazine hydrae, ethyl alcohol, kerosene or liquid hydrogen. Also the above mentioned liquid oxidizer can be but not limited to liquid oxygen or various forms of nitric acid.

Here the combustion of liquid propellants will generate the heat sufficient enough to trigger the initiation of solid propellant pellet projectile.

Figure 9A:
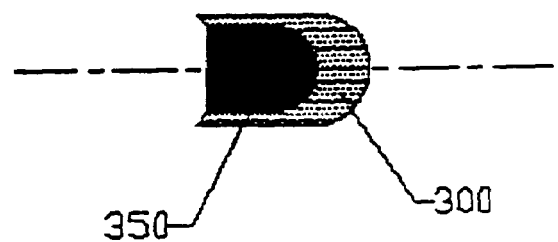
FIG. 9A shows an enlarged view primer being used as a triggering system for the above embodiments.
Figure 9B:
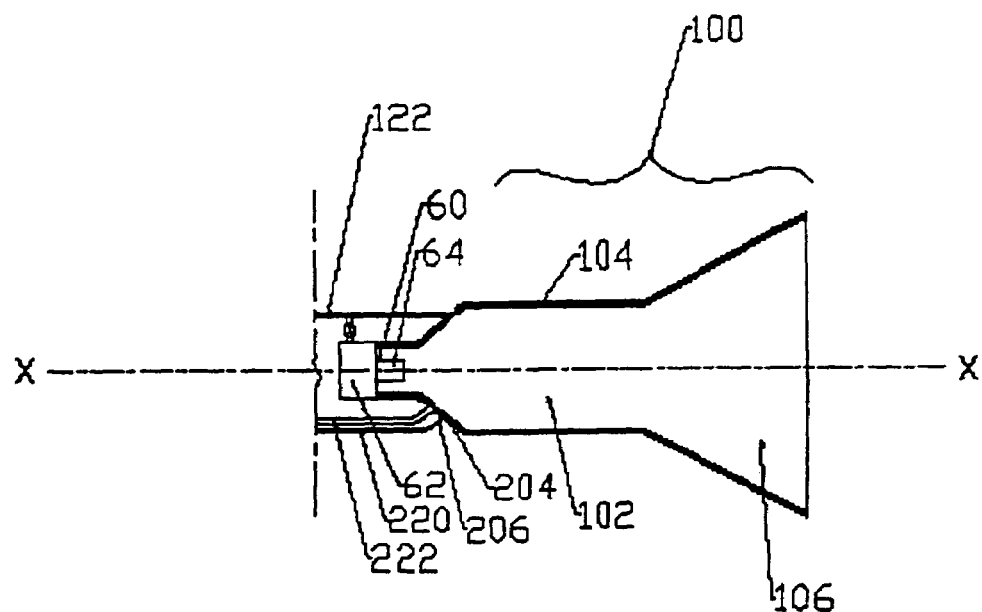
FIG. 9B shows an enlarged view of using a liquid propellant to initiate the solid propellant pellet as a triggering system for the above embodiments.

Referring to FIG. 9B the combustion of liquid fuel in the presence of oxidizer takes place inside the combustion chamber 102, whereby the liquid fuel arrives through liquid fuel pipeline 220 and the oxidizer arrives through oxidizer pipeline 222. The combustion of said liquid fuel produces heat that initiates the solid propellant pellet projectile exiting from the barrel 64 of gun assembly 60.

Thrust Chamber 100

Referring to FIGS. 1-6, the thrust chamber 100 generally consists of a combustion chamber and an exhaust nozzle. The thrust chamber 100 is shielded 104 on the inside with material that could withstand the heat and high pressures of combustion of propellant pellets. The above mentioned shield can be such as but not limited to ceramics or heat resisting alloys.

The shielded chamber can withstand the shocks of detonation. As shown in FIGS. 1,2,5 and 6, the thrust chamber 100 preferably consists of a combustion chamber 102 and an exhaust nozzle 106.

For the turbojet mode (FIGS. 3-4) of the invention, a turbine can be mounted on a hollow shaft in between combustion chamber 102 and exhaust nozzle 106 along the said longitudinal axis can be used. For the turbojet mode of the invention, the thrust chamber 100 can include a combustion chamber 102, turbine 130, and an exhaust nozzle 106. The combustion chamber 102 is generally a hollow shell of circular cross-section with one end of the said shell facing the barrel 64 of gun assembly 60 and other end generally connected to the inlet section of exhaust nozzle 106. The combustion chamber 102 needs to be long enough to allow complete combustion of a propellant pellet-projectile. The combustion chamber 102 can be shielded 104 on the inside with a material to withstand heat and high pressures of combustion.

Figure 3:
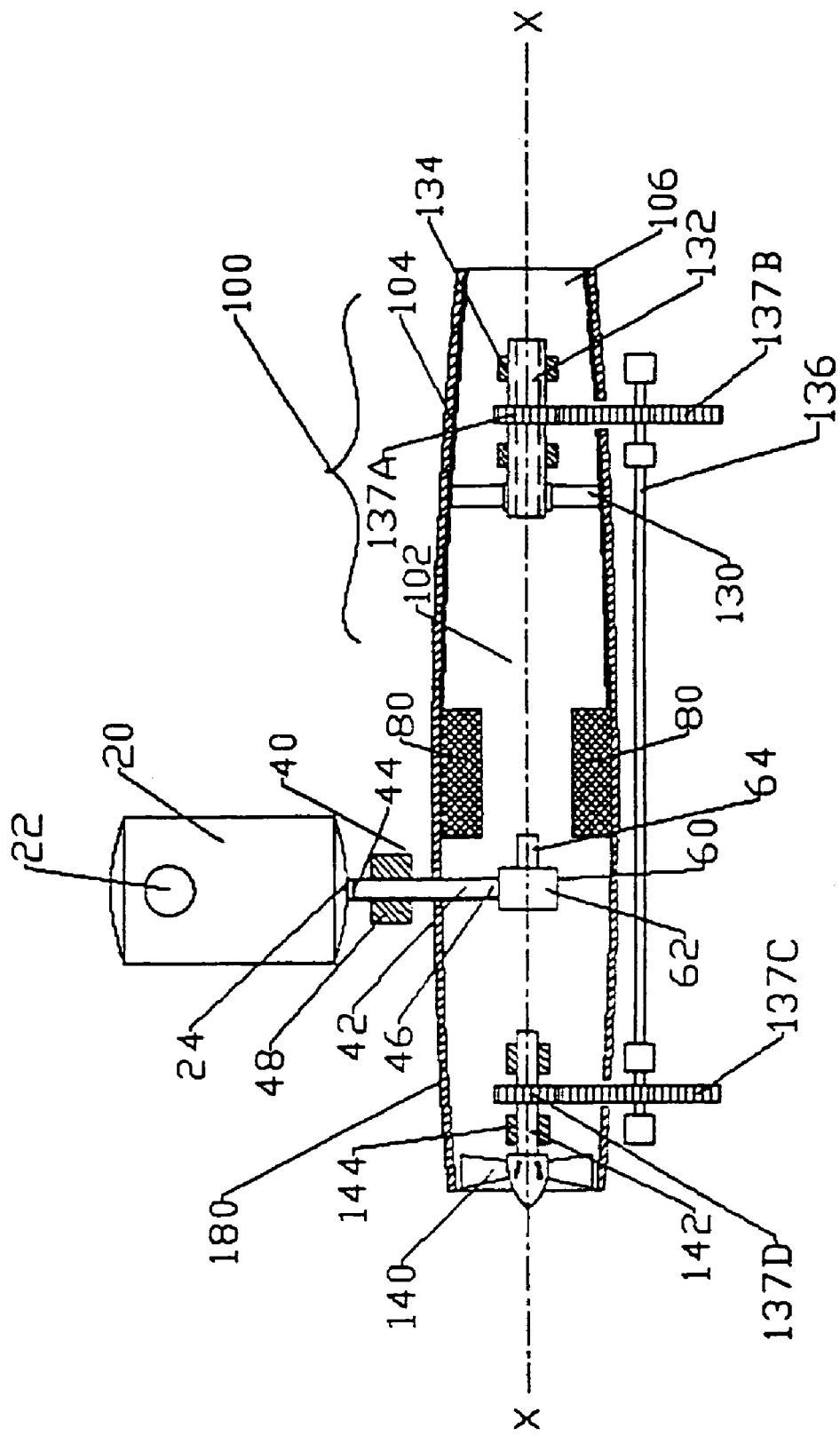
FIG. 3 is a schematic sectional elevation view of a preferred embodiment of the present invention in turbojet mode using only solid propellants.
Figure 4:
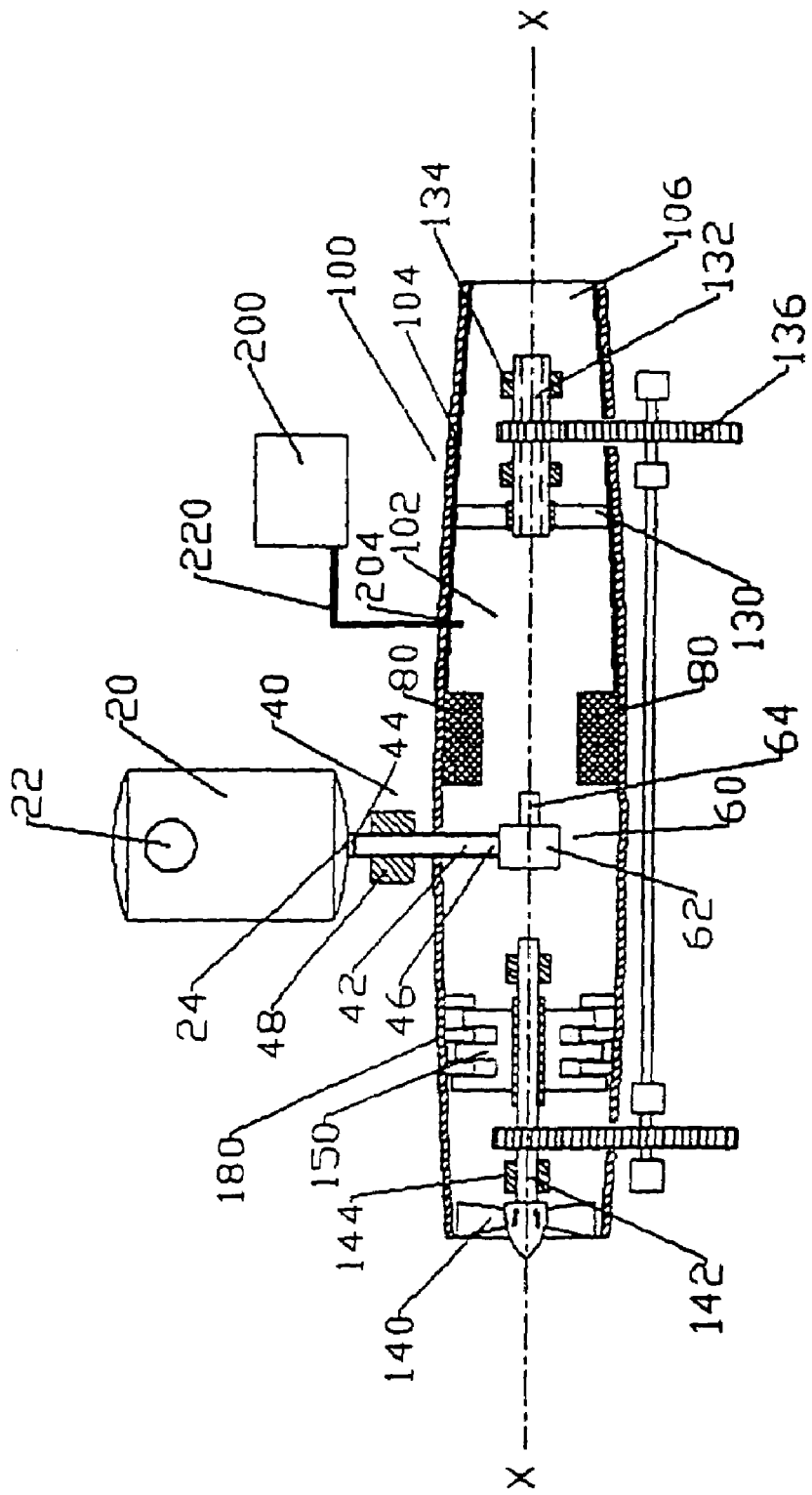
FIG. 4 is a schematic sectional elevation view of a preferred embodiment of the present invention in turbojet mode using both solid and liquid propellants.

The turbine 130 of FIGS. 3-4 can be mounted on one end of a hollow shaft 132 mounted on bearings 134. The said hollow shaft 132 can be connected to an external gearing arrangement 136 that drives (rotates) the fan shaft 142 to power the fan 140 and a compressor 150.

The external gearing arrangement 136 delivers power from the turbine 130 to the fan 140 and compressor 150. The external gearing arrangement 136 can be but not limited to a speed reduction arrangement, which depends on the performance required for the aircraft.

The power from the turbine is transferred to the external gearing arrangement 136 through gear 137A coupled to the hollow shaft 132 and gear 137B respectively. From the external gearing arrangement 136 the power is then transferred to the fan shaft 142 through gears 137C and gear 137D respectively.

The external gearing arrangement 136 is provided to clear any obstruction to the propellant pellet projectile. Further the hollow shaft 132, on which the turbine 130 mounted; make sure any un-detonated propellant pellets hitting the turbine 130. The compressor 150 can be either centrifugal or axial compressors.

Referring to FIGS. 1-6, the exhaust nozzle 106 can be of convergent, divergent, convergent-divergent, variable thrust nozzle profile or the like.

Figure 10B:
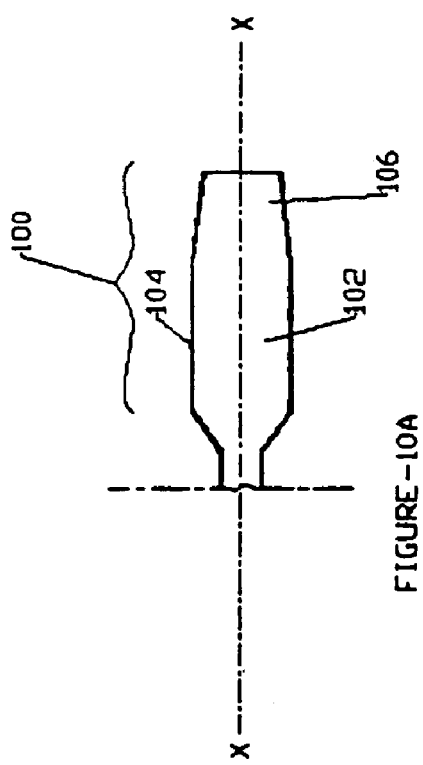
FIG. 10B shows a divergent nozzle for use with the above embodiments.
Figure 10D:
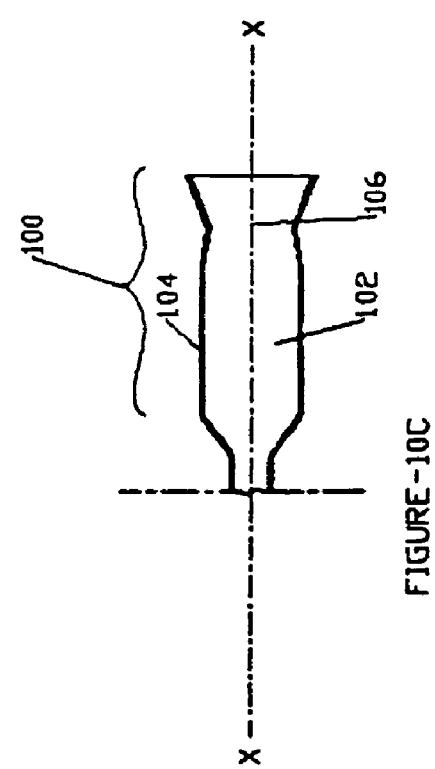
FIG. 10D shows a moveable surfaces nozzle for use with the above embodiments.
Figure 10A:
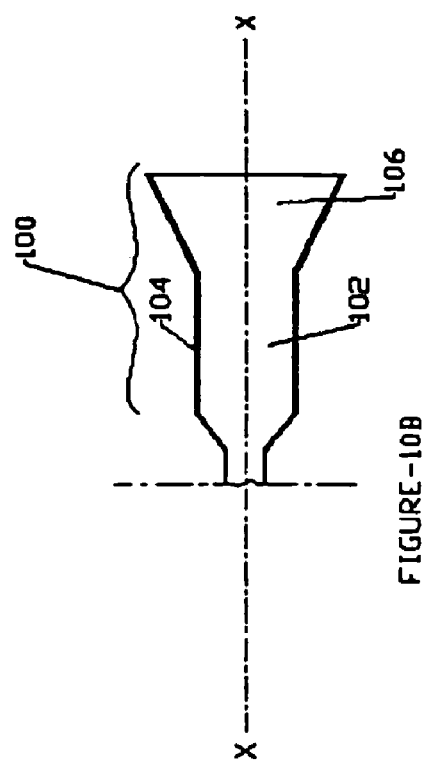
FIG. 10A shows a convergent nozzle for use with the above embodiments.
Figure 10C:
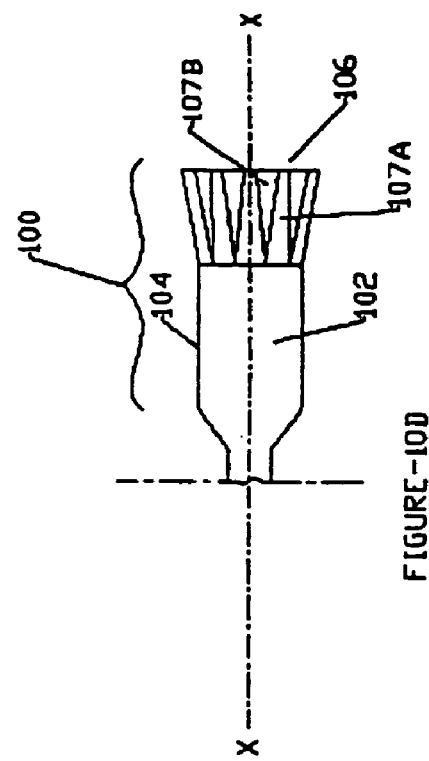
FIG. 10C shows a convergent-divergent nozzle for use with the above embodiments.

A convergent nozzle have a decreasing cross-sectional area (FIG. 10A), a divergent have an increasing cross-sectional area (FIG. 10B) and a convergent-divergent have a cross-sectional area that converges down to the minimum area (throat), then diverges (FIG. 10C).

One type of variable thrust nozzle profiles have movable surfaces so that the change in cross-sectional area can be varied, to improve efficiency. Referring to FIG. 10D the variable thrust nozzle 106 have two sets of moving petals (similar to petals of a flower), 107A and 107B. The inside surface of 107A is in contact with the outside surface of 107B and by their relative movement variable thrust can be achieved.

FIG. 10A shows a convergent nozzle for use with the above embodiments. FIG. 10B shows a divergent nozzle for use wit the above embodiments. FIG. 10C shows a convergent-divergent nozzle for use with the above embodiments. FIG. 10D shows a moveable surfaces nozzle for use with the above embodiments.

The selection of the above mentioned profiles generally depend on the type of combustion in the thrust chamber that can be either detonation or deflagration and also the application for which the invention is used. Deflagration is a relatively gentle and rapid burning of fuel. Detonation is a much more powerful reaction (explosion) of the fuel and results in such a rapid reaction that the pressure-wave created travels at super-sonic speeds.

The cross-section of exhaust nozzle 106 can include various shapes such as but not limited to circular, oval, square, rectangular, and the like, and combinations thereof.

Auxiliary Power System

The auxiliary power system is used for powering various systems within the invention. These above mentioned systems might include pellet feeding mechanism, gun assembly, triggering system, and the various electrical and electronic systems.

The electric and electronic systems include control system 500. The function of the said control system 500 is to control and monitor the various engine components such as but not limited to the triggering mechanism, pellet feeding mechanism, control valves and gun assembly that are present in the invention. The control system can be computers, programmable logical controllers (PLCs) or the like. For example, the control system can be such as but not limited to Intel-Pentium based PCs or Motorola processor based PLCs. The control system 500 collects data from the various mechanisms mentioned above and act accordingly (for example, sent signal back to mechanisms to correct their functions). As shown in FIG. 1, the control system 500 is connected to triggering mechanism, pellet feeding mechanism and gun assembly by cables 550. The cables 550 can such as but not limited to control bus, optical fibers or the like.

Figure 2:
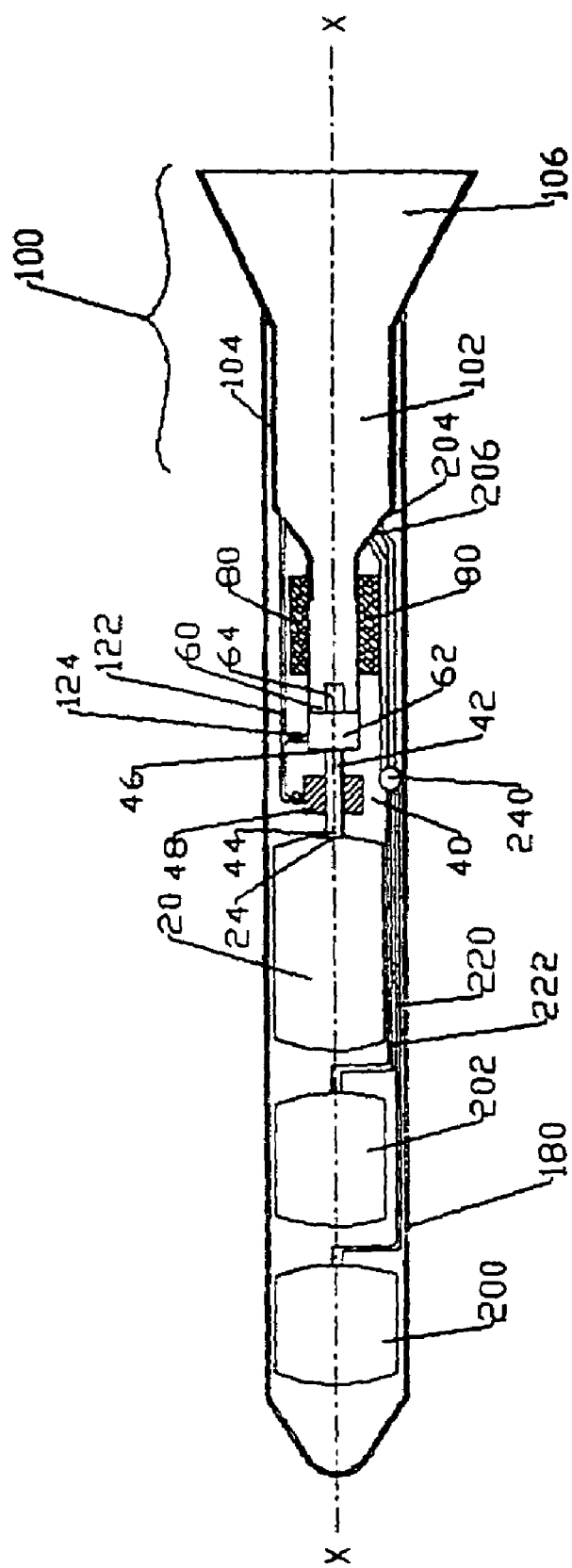
FIG. 2 is a schematic sectional elevation view of a preferred embodiment of the present invention in rocket or space mode using both solid and liquid propellants.

Referring to FIGS. 1-2, the auxiliary power system for the rocket space mode application can preferably include piping 122 for circulating tapped exhaust gases from the thrust chamber 100, control valves 124 for controlling the flow of exhaust gases through the piping 120, and optionally small turbines 128 for powering the various systems within the invention.

Referring to FIGS. 3-4, the auxiliary system in the case of turbojet mode of the invention can power the fan and a compressor. The auxiliary power can be derived from the external gearing arrangement 136 that is driven by the turbine 130. Even though the auxiliary power system can be designed to use the tapped power from the propulsion system, it would not limit the invention in using external power sources such as batteries or other power systems.

FIG. 1 shows an external power system 400 that initially start up the propulsion system (invention) by supplying power to various sub-systems (mechanisms) present in the invention. These sub-systems include pellet feeding system 40, gun assembly 60, triggering system 80, control system 500 and the like.

Housing 180

Referring to FIG. 1 for the rocket and space mode application using a solid propellant, the housing 180 can enclose the storage chamber 20, the feeding system 40, the gun assembly 60, the triggering system 80 and the combustion chamber 102.

Referring to FIG. 2 for the rocket and space mode application using a solid and liquid propellant, the housing 180 can also enclose the liquid fuel tank 200, the oxidizer tank 202, the fuel pipelines 220, the oxidizer pipelines 222, and the pump 240 in addition to that described for FIG. 1.

Referring to the turbojet and ramjet applications of FIGS. 3-6, the housing 180 covers from inlet to outlet of the respective engines.

Orientation of Components

As shown in FIGS. 1-6, the storage chamber 20 can be connected at its outlet 24 to the inlet 44 of the feeding channel 42 and the outlet 46 of the feeding channel 42 is connected to the gun assembly 60. The barrel 64 of the gun assembly 60 can be positioned along a longitudinal axis X-X, preferably in the case of single-barrel gun assembly the longitudinal axis X-X passes through the geometric center of the barrel 64. The triggering system 80 can be positioned in between the gun assembly 60 and combustion chamber 102, generally surrounding the path of the propellant pellet-projectile along the longitudinal axis X-X.

The thrust chamber 100 in the case of a rocket engine or a space vehicle (FIGS. 1-2) and a ramjet engine (FIGS. 5-6) can consist of a combustion chamber 102 and an exhaust nozzle 106, with the outlet of the combustion chamber 102 connected to the inlet section of the exhaust nozzle 106.

The thrust chamber 100 in the case of a turbojet engine (FIGS. 3-4) can consist of a turbine 130 in between the combustion chamber 102 and the exhaust nozzle 106. The turbine 130 shown in FIGS. 3-4 can be mounted on one end of a hollow shaft 132 that has a gear connected to it. The mentioned gear drives a gearing arrangement 136 that drives the fan shaft 142 to power the fan 140 (FIGS. 3-4) and a compressor 150 as shown in FIG. 4.

The auxiliary power system in the case of a rocket engine or a space vehicle (FIGS. 1-2) and optionally in a ramjet engine (FIGS. 5-6), can tap exhaust gases from the thrust chamber 100 through a piping 122 and use the tapped exhaust gases to power the various systems within the invention. The piping 122 can have control valves 124 connected to them for regulating the flow of exhaust gases.

In the case of turbojet engine (FIGS. 3-4) the auxiliary power can be derived from the external gearing arrangement 136.

Figure 6:
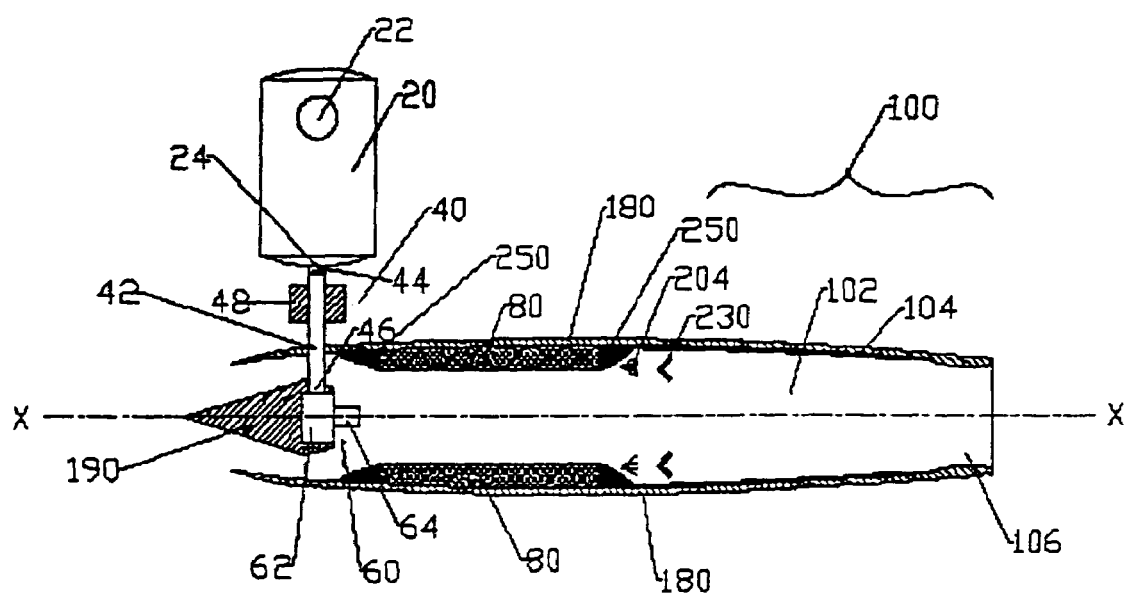
FIG. 6 is a schematic sectional view of a preferred embodiment of the present invention in ramjet mode using both solid and liquid propellants.

Solid and Liquid Propellants Application FIGS. 2, 4, 6

An alterative variation of the invention that uses both solid and liquid propellants is shown in FIGS. 2, 4 and 6 of the drawings. The FIG. 2 shows a rocket or space vehicle engine that uses both solid and liquid propellants have, in addition to components mentioned for a rocket engine that uses only solid fuel (FIG. 1), a liquid fuel tank 200 and a oxidizer tank 202 can be connected to the combustion chamber 102 by fuel pipelines 220 and oxidizer pipelines 222 respectively. Both fuel pipelines 220 and oxidizer pipelines 222 can be connected to a pump 240 that can be driven by the auxiliary power system. The pump 240 pumps liquid fuel and oxidizer from their respective tanks into the combustion chamber 102. The liquid propellants mentioned above can be either monopropellants or bipropellants. Liquid monopropellants can be such as but not limited to nitromethane or hydrogen peroxide mixed with ethyl alcohol. In the case of bipropellants, fuel and oxidizer are kept physically separated until they are injected into the combustion chamber 102. The above mentioned liquid fuel can be such as but not limited to Aniline, hydrazine hydrae, ethyl alcohol, kerosene or liquid hydrogen. Also the above mentioned liquid oxidizer can be but not limited to liquid oxygen or various forms of nitric acid. The pump 240 can be such as but not limited centrifugal or axial pump.

FIG. 4 shows a turbojet engine that uses both solid and liquid propellants, in addition to components mentioned for a turbojet engine that uses only solid fuel (FIG. 3), have a liquid fuel tank 200 that is connected to the fuel injector 204 that injects fuel into the combustion chamber 102 through fuel line 220. FIG. 6 shows a ramjet engine that uses both solid and liquid propellants, in addition to components mentioned for a ramjet engine that uses only solid fuel (FIG. 5), have fuel injectors 204 and flame holders 230. The liquid fuel mentioned above can be such as but not limited to gasoline, kerosene, diesel, alcohol, propane, butane or hydrogen. The liquid fuel is delivered into the combustion chamber 102 in vaporized or atomized form by the liquid fuel injector 204.

Methods of Operating the Systems

A general method of operation of the invention in FIGS. 1-6 will now be described. The invention uses slid propellant pellets of a selected shape profile. The selected shape profile can be such as but not limited to shape of a hollow bullet. Here the propellant mass is more concentrated at its tip (forward end) than its back. The propellant pellets that are stored in the storage chamber 20 are fed to the gun assembly 60 through the feeding channel 42 by the feeding mechanism 48. In the gun assembly 60, the ejector mechanism 62 ejects the propellant pellets through the barrel 64 at a certain velocity. The speed of the propellant pellets can be anywhere between approximately 10 to approximately 10000 m/s (approximately 30 to approximately 33000 fps). The requirement for a particular speed depends on the type of propellant, its combustion characteristics and triggering medium.

The barrel 64 gives direction to the propellant pellets ejected. The propellant pellet-projectiles emerging from the barrel 64 interacts with the medium generated by the triggering system 80, causing the initiation of propellant pellets. The combustion of the propellant pellets takes place inside the combustion chamber 102.

In the case of nuclear propellant pellet-projectiles, nuclear fission reaction can take place inside the combustion chamber 102. The velocity and the shape profile of the propellant pellets would be such that almost all the combustion gases evolved would move only in the forward direction. Finally the hot gases expand in the nozzle 106 producing thrust for the engine. In general, the thrust produced by the invention can be varied by controlling the number of pellets ejected from a barrel 64 in a time period and also by controlling the total number of pellets ejected at any particular instant in the case of multi-barrel gun assembly.

Generally when the time between the combustion of consecutive propellant pellets is more the system will be in pulsed mode (intermittent operation), as the above mentioned time gap decreases the system will move towards continuous mode (smooth operation). The time between two successive propellant pellets ejected can be varied by changing the rate at which ejector mechanism 62 works. For example, the time between two successive propellant pellets ejected can vary between a few nanoseconds to a few seconds. In the case of multi-barreled gun assembly 60, the total number of pellets ejected can be varied from all the barrels ejecting pellets at a time to each barrel ejecting in sequence.

FIG. 1 illustrates an examplary embodiment of the invention in rocket mode that uses only solid propellant pellets for propulsion. FIG. 2 illustrates another examplary embodiment of the invention in rocket mode that uses solid propellant pellets as well as liquid propellants for propulsion. In addition to the components illustrated in FIG. 1, FIG. 2 contains a liquid fuel tank 200, an oxidizer tank 202, fuel pipelines 220, oxidizer pipelines 222, and a pump 240. The combustion of both solid and liquid propellants takes place inside the combustion chamber 102 and the resulting hot gases expand in the nozzle 106.

Figure 11:
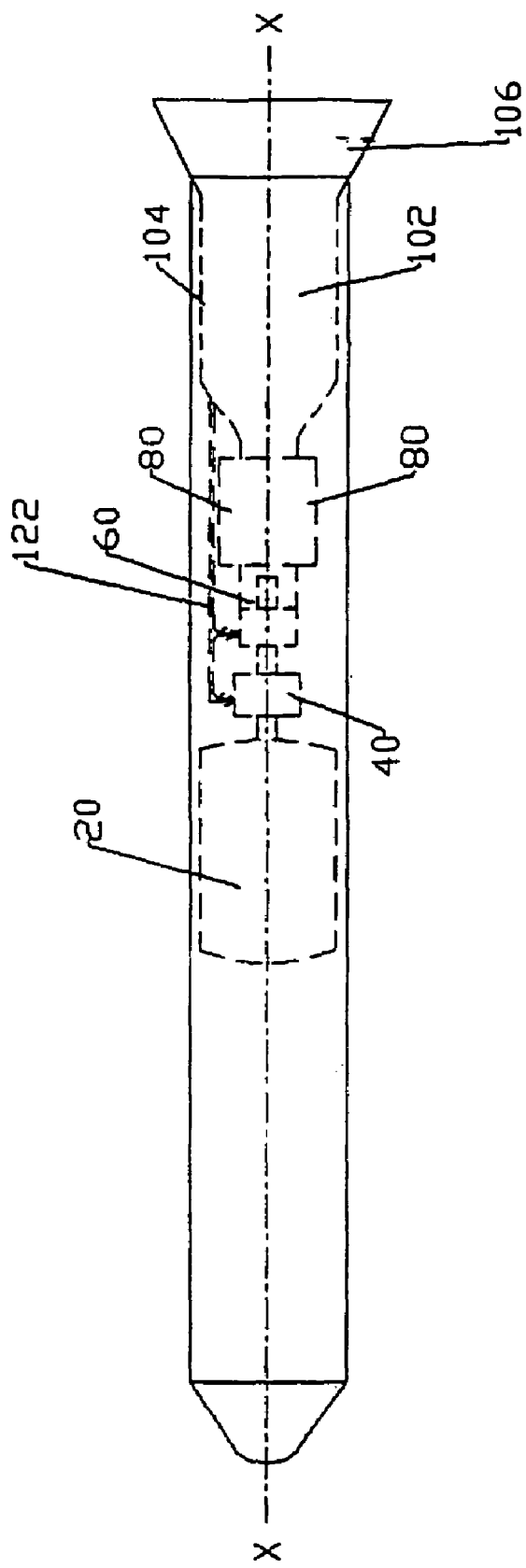
FIG. 11 shows a schematic view of a rocket/space application for use with the embodiments of FIGS. 1-2.

FIG. 11 shows a schematic view of a rocket/space application for use with the embodiments of FIGS. 1-2.

FIG. 3 illustrates another examplary embodiment of the invention in turbojet mode that uses only solid propellant pellets for propulsion. The liquid fuel tank, fuel lines and fuel injector in a conventional turbojet engine are replaced by storage chamber 20, feeding system 40, gun assembly 60 and triggering system 80 in the said mode of invention. Since the compressor in a conventional turbojet does not contribute any significant results in this mode of invention, it is not shown in FIG. 3. The shaft 132 can be made hollow to allow any un-detonated propellant pellet projectiles to pass through. Alteratively the fan 140 can be replaced by a propeller as in a conventional turbo-propeller engine.

FIG. 4 illustrates another examplary embodiment of the invention in turbojet mode that uses solid propellant pellets as well as liquid propellants for propulsion. In addition to the components illustrated in FIG. 3, FIG 4 contains a liquid fuel tank 200, fuel pipeline 220, fuel injector 204 and a compressor 150 that are present in a conventional turbojet engine.

Figure 12:
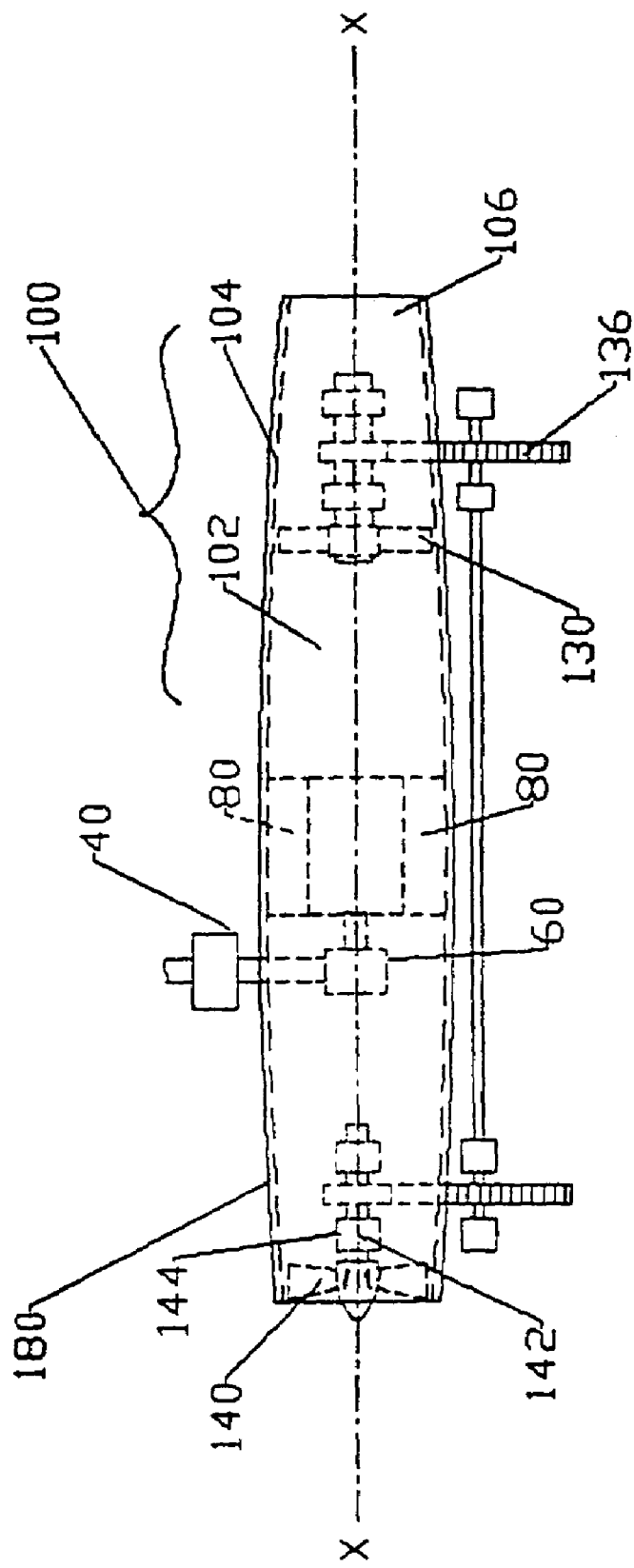
FIG. 12 shows a schematic view of a turbojet application for use with the embodiments of FIGS. 3-4.

FIG. 12 shows a schematic view of a turbojet application for use with the embodiments of FIGS 3-4.

Figure 5:
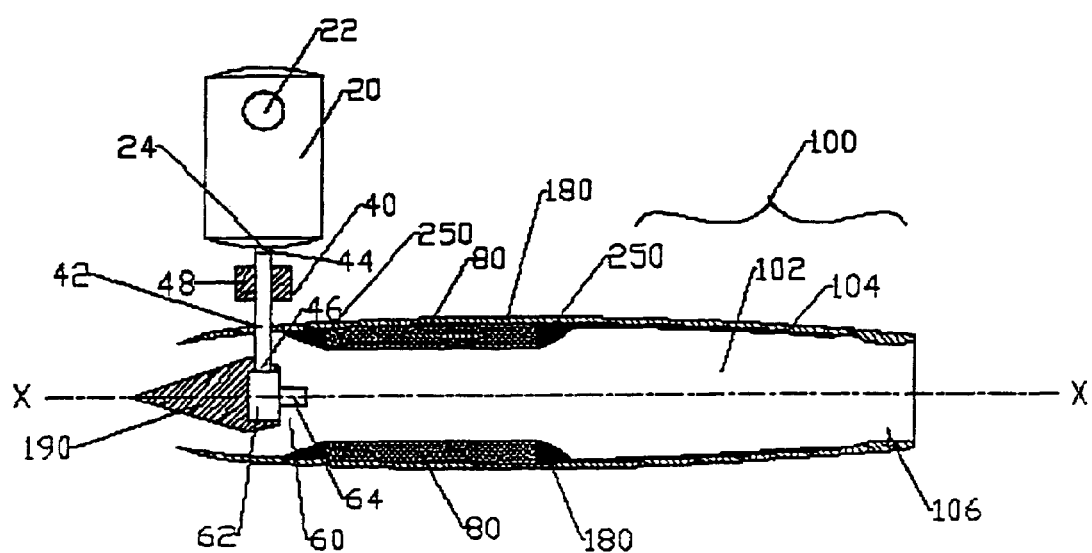
FIG. 5 is a schematic sectional elevation view of a preferred embodiment of the present invention in ramjet mode using only solid propellants.

FIG. 5 illustrates another exemplary embodiment of the invention in ramjet mode that uses only solid propellant pellets for propulsion. The gun assembly 60 can be preferably mounted behind the diffuser 190. The triggering system 80 can be preferably placed in between the tapered sections 250 to allow smooth flow of air through the engine. FIG. 6 illustrates another examplary embodiment of the invention in ramjet mode that uses solid propellant pellets as well as liquid propellants for propulsion. In addition to the components illustrated in FIG. 5, FIG. 6 can contain fuel injectors 204 and flame holders 230 that are present in a conventional ramjet engine.

The air flow through the ramjet will extinguish the flame produced from the combustion of liquid fuel; the flame is necessary for sustaining combustion. The flame holders 230 shied the flame from being blown out by the air flow.

The purpose of the flame holders 230 is to provide an environment where the fuel injected by fuel injectors 204 will burn without blowing out. Also the flame holders 230 should not obstruct the path of propellant pellet projectiles. The flame holder can be such as but not limited to gutter-type or can-type. Gutter-type is just a V or U shaped piece of metal, alloy or ceramic material with the open side facing downwind. Can-type is usually shaped like a can made of metal, alloy or ceramic material (though it may be conical, spherical or other).

Inside the gutter or can the fuel/air mixture is highly turbulent with small pockets of slow moving eddies. It is in these eddies that the flame is actually held without being blown out by the air flow, spreading to the rest of the fuel/air mixture.

Figure 13:
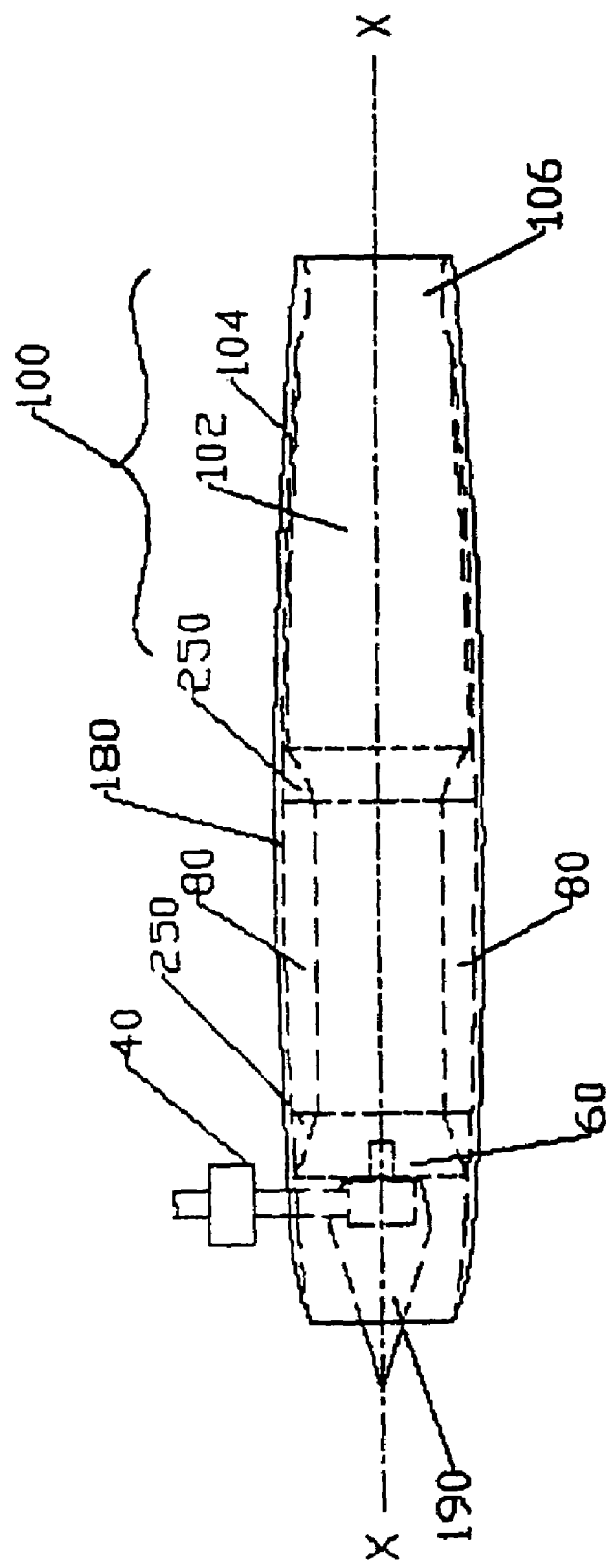
FIG. 13 shows a schematic view of a ramjet application for use with the embodiments of FIGS. 1-2.

FIG. 13 shows a schematic view of a ramjet application for use with the embodiments of FIGS. 1-2.

Figure 7:
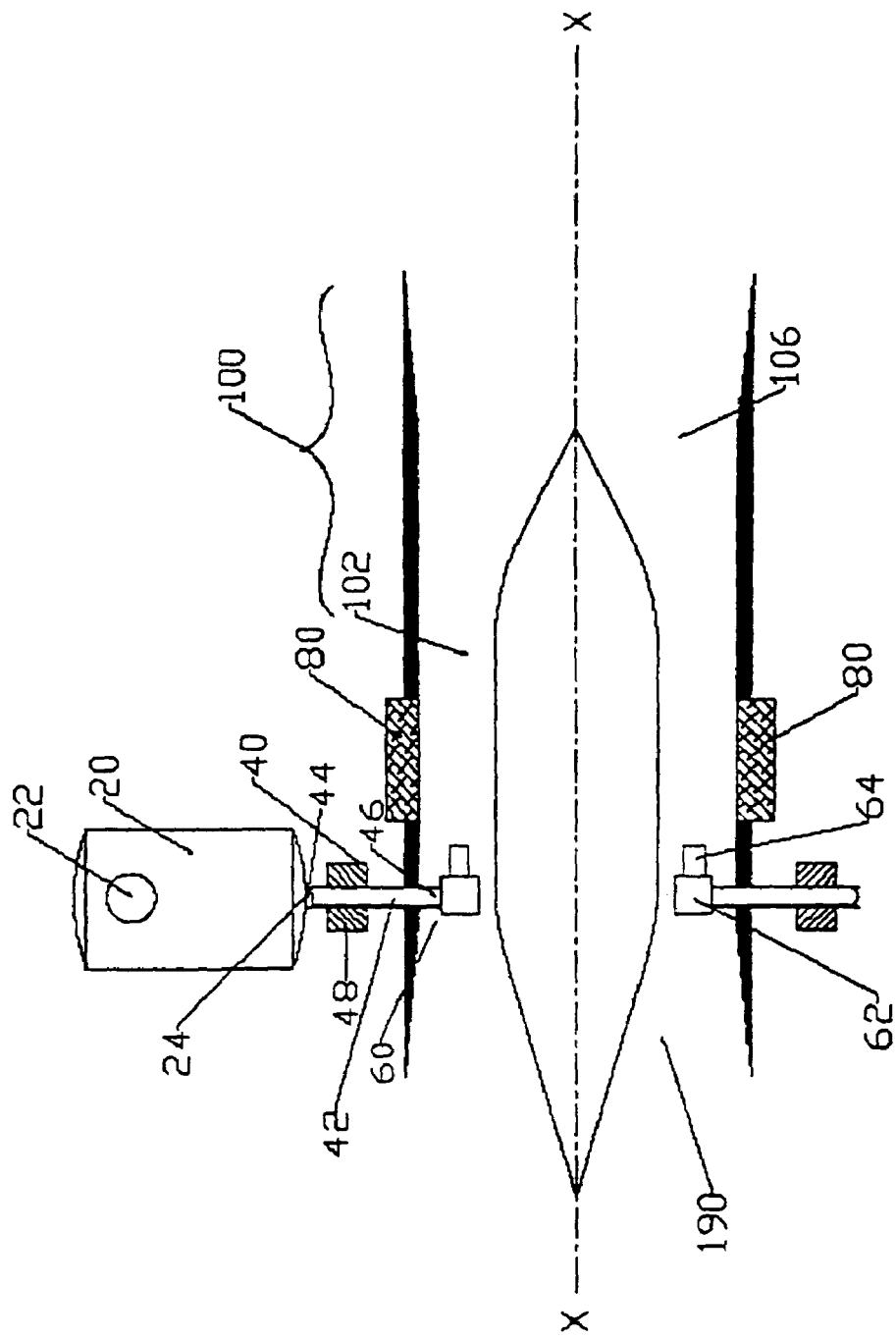
FIG. 7 is a schematic sectional elevation view of a preferred embodiment of the present invention in scramjet mode using both solid and liquid propellants.
Figure 8:
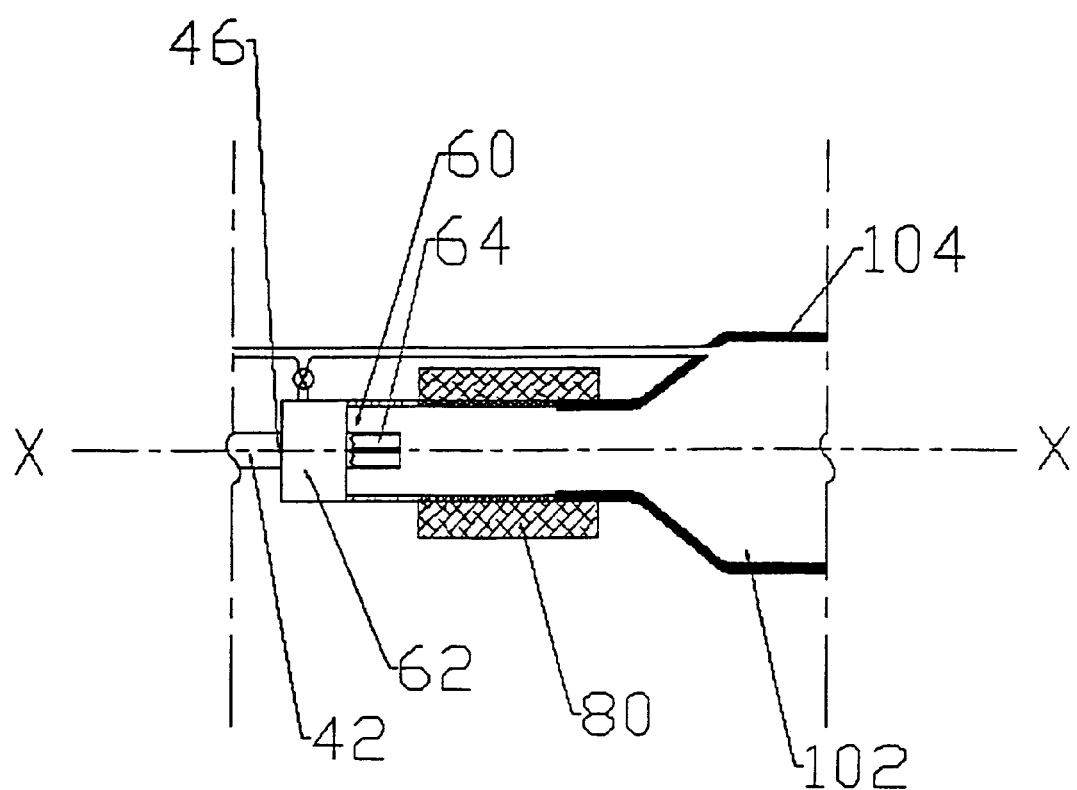
FIG. 8 shows an enlarged sectional view of using two or more barrels with a single ejector mechanism in the gun assembly of the previous embodiment figures.

The invention can also be used in scramjet mode (FIG. 7) with suitable modifications such as gun assemblies replacing some or all of the hydrogen fuel injectors and a triggering system that surrounds the path of propellant pellets ejected from the gun assembly.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size materials, shape, form, function and manner of operation, assembly and use, are deemed readily apparent and obvious to one skilled in the art and all equivalent relationships to those illustrated in the drawings and described in the specification are intended to be encompassed by the present invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A propulsion system for forming propulsion from solid propellant projectiles, comprising:
    a storage chamber for housing a solid propellant pellet;
    a feeder for driving the pellet from the storage chamber through a feeding channel;
    a gun assembly connected to the feeding channel of the feeder for ejecting the pellet as a projectile at a selected velocity through a barrel;
    a combustion trigger for triggering combustion of the pellet exiting the barrel at the selected velocity, the triggering including a primer for generating a timed detonation of the pellet; and
    a thrust generator for forming a thrust source for a vehicle.

2. The system of claim 1, wherein the trigger includes:
    a thermal medium for initiating a thermal instability in the solid propellant pellet.

3. The system of claim 2, wherein the medium for the initiating of the thermal instability includes: a microwave generator.

4. The system of claim 2, wherein the vehicle includes:
    an outer space vehicle for using the system.

5. The system of claim 2, wherein the barrel includes: at least two barrels.

6. A method of generating a pressure source from combustion of a propellant, comprising the steps of:
    feeding a solid propellant pellet to a gun;
    ejecting the propellant pellet from the gun through a combustion chamber at a selected velocity;
    triggering combustion of the ejected propellant pellet while the propellant pellet is being ejected at the selected velocity adjacent to the combustion chamber; and
    generating a pressure source from the combustion chamber as a thrust source for a vehicle.

7. The method of claim 6, wherein the step of triggering combustion includes the step of:
    initiating a thermal instability in the ejected propellant pellet with a thermal medium.

8. The method of claim 7, wherein the thermal medium includes: a microwave generator.

9. The method of claim 7, further comprising the step of:
    selecting a timed sequence for at least one of the steps of feeding, ejecting, and triggering combustion.

10. The method of claim 9, wherein the feeding, ejecting, triggering and generating thrust steps occurs within a single vehicle housing.

* * * * *